Patented July 29, 1941

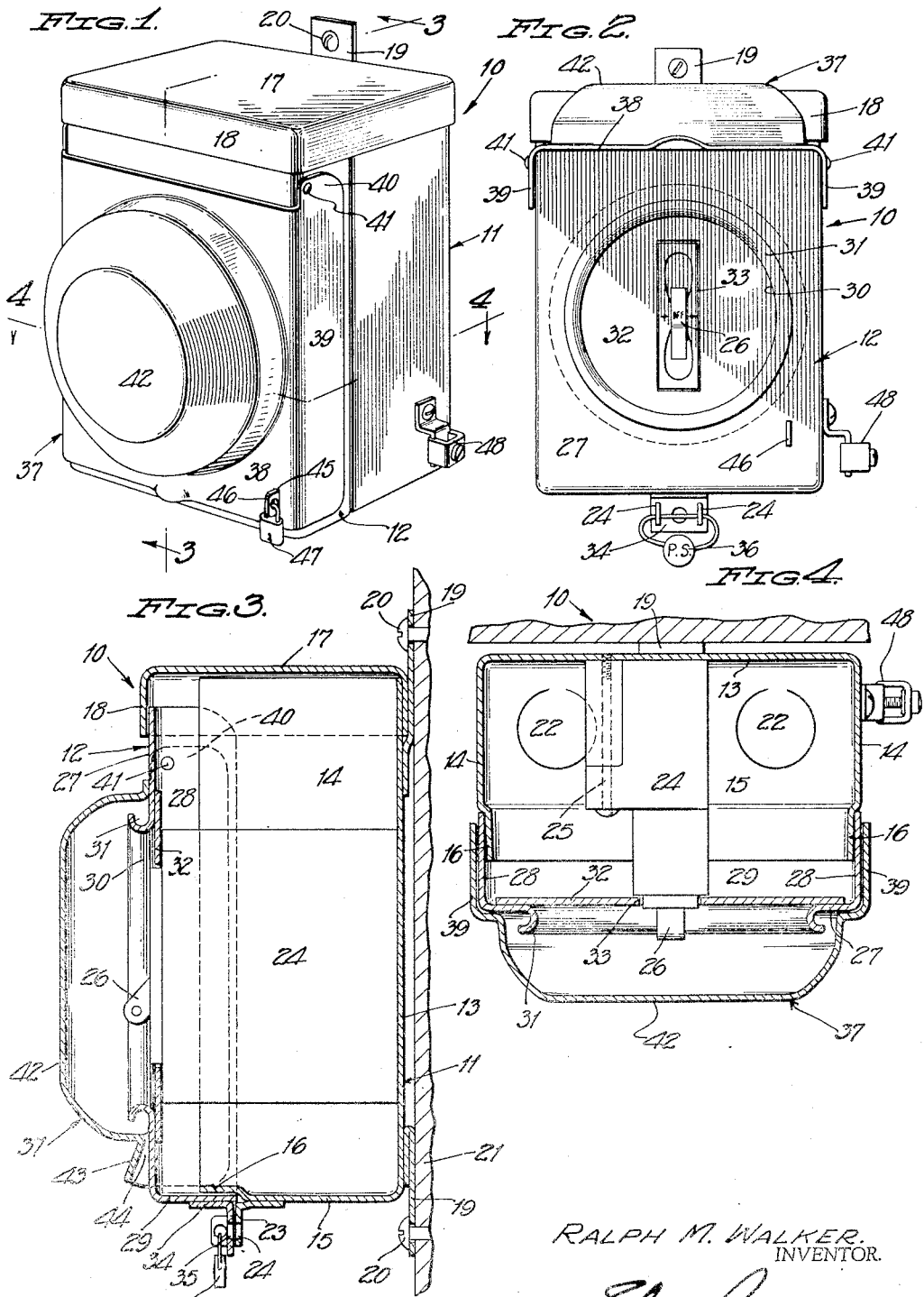

2,250,977

UNITED STATES PATENT OFFICE 2,250,977

WEATHERPROOF BOX FOR ELECTRIC CIRCUIT BREAKERS AND OTHER ELECTRICAL DEVICES

Ralph M. Walker, Atlanta, Ga.

Application September 1, 1939, Serial No. 293,017

3 Claims. (Cl. 220—3.8)

This invention relates to improvements in weatherproof boxes for the housing of electric circuit breakers, switches, fuses, and other electrical devices.

One of the important objects of the invention resides in a metal weatherproof box for electrical circuit breakers and the like, which may be exposed to the elements and sealed by the public service company against unauthorized tampering with the wire connections of a circuit breaker or other electrical device which may be housed therein, but which enables the subscriber of electricity to obtain free access to the manually operated circuit breaker handle or other part of an electrical device ordinarily available to a subscriber which may be housed within the box.

Another feature of the invention is the provision of a weatherproof box having an opening in the front thereof through which the actuating handle of a circuit breaker extends, the open front being normally closed by an upward and downwardly swinging door which causes an exposed joint to be formed between the top of the door and adjacent front wall of the box, any water which may enter this exposed joint being shed about the opening by a novel annular trough which extends therearound and eventually draining through the joint between the bottom edge of the door and the front wall of the box.

A further feature of the invention is to provide a weatherproof box of the above mentioned kind having inner and outer doors, the inner door being locked or sealed by the public service company and through which the actuating handle of a circuit breaker extends, and which actuating handle is protected by the outer door to prevent tampering with the handle and the mischievous insertion of wire or sticks into the box which might short circuit or interfere with the operation of the circuit breaker or other electrical instrument contained within the box.

A still further feature of the invention resides in a weatherproof box for circuit breakers and like electrical devices in which the metal parts are formed by "drawing" instead of by the usual bending method whereby the formation of welded joints is eliminated.

Other features of the invention will be apparent as the following specification is read in conjunction with the accompanying drawing, in which:

Figure 1 is a perspective view of my improved weatherproof box in sealed locked condition.

Figure 2 is a front elevational view of the box with the door unlocked and raised to a horizontal open position.

Figure 3 is an enlarged vertical transverse sectional view on the line 3—3 of Figure 1.

Figure 4 is an enlarged horizontal sectional view on the line 4—4 of Figure 1.

Referring to the drawing by reference characters, the numeral 10 designates my improved weatherproof box in its entirety which is square or rectangular in configuration and includes broadly a box body 11 open at its front, and a removable cover 12 fitted to the open front of the body for closing the same. The body 11 includes a rear wall 13, opposed side walls 14—14, and a bottom wall 15, all drawn from a single blank of metal to avoid joints at the corner bends. The free edge portions of the side walls 14—14 and bottom wall 15 are bent inwardly to provide a continuous offset flange 16 therearound. The top of the box body is closed by a flat top wall 17 having downwardly extending flanges 18 around the four sides thereof. The top wall 17 and side flanges 18 are formed by drawing the same from a single blank of metal to avoid joints at the corner bends. The flanges 18, with exception of the front flange, respectively engage the outer sides of the rear wall 13 and side walls 14—14, whereas the front flange 18 is disposed forward of and in spaced relation to the front edges of the side flanges 16, with the top wall 17 overhanging the open front of the box body. The side and rear flanges 18 are welded to the rear and side walls respectively, and the forward portions of the side flanges 18 are disposed in spaced relation to the upper portions of the flanges 16 on the side walls 14—14 to permit of the insertion of the upper end of the cover 12 in a manner to be explained hereinafter. Welded or otherwise attached to the exterior of the rear wall and extending beyond the top and bottom of the box body are attaching brackets 19—19 having openings therein for the passage of fastening screws 20 which enter a supporting structure 21. The bottom wall 15 is provided with knockout openings 22 to facilitate the insertion of electric wires into the box through the bottom thereof. An inverted L-shaped bracket 23 is secured to the exterior of the bottom wall 15 inwardly of the flange 16 and the depending leg portion is provided with spaced forwardly extending ears 24.

Whereas various electrical devices may be housed in the weatherproof box 10, I have illustrated in the drawing an electric circuit breaker 24 which is fastened to the rear wall 13 by screws 25. The front of the circuit breaker extends beyond the plane of the front edges of the side and bottom walls of the box body 11 and is disposed substantially centrally of the open front thereof. The front face of the circuit breaker 24 is rectangular and has a manually actuable handle 26 extending therefrom which is swung upwardly to "on" position and downwardly to "off" position. The circuit breaker 24 is provided with the usual wire connector terminals to which the wires adapted to enter the box through the "knockout-openings" 22 are connected.

The removable cover 12 includes a flat front wall 27 having flat rearwardly extending side walls 28—28 and a bottom wall 29 integral therewith. The walls 27, 28—28, and 29, are drawn from a single blank of metal to avoid joints at the corner bends. A round opening 30 is provided in the front wall 27 substantially centrally thereof and the walls of the opening are rolled forwardly to provide an annular channel or trough 31 which completely surrounds the opening for shedding water from the opening in a manner to be hereinafter fully explained. Closing the opening 30 is a metal plate disk 32 which fits against the rear side of the front wall 27 and is secured thereto by welding so as to form an integral part of the cover 12. The plate disk 32 is provided with a rectangular shaped slot 33 which conforms to the size of the front face of the circuit breaker 24 and through which the same projects. Thus, only the front face of the circuit breaker including the handle 26 is exposed through the cover 12.

The cover 12 is applied to the box body 11 by first bringing the upper portions of the side walls 28—28 of the cover into lapping engagement with the upper portion of the offset flange 16 on the side walls 14—14, the operator then slides the cover upwardly with the lower end tilted outwardly to cause the top end of the cover to slide to a position to be embraced by the flanges 18 of the roof of the box body. The lower end of the cover may now be pushed inwardly to cause the bottom wall 29 thereof to underlie the flange 16 on the bottom wall 15. The upper end of the cover is now locked beneath the top of the box-body and the lower end is sealed by the alinement of an inverted L-shaped bracket 34 carried by the bottom wall 29 with the bracket 23. The bracket 34 has slots 35 therein which receive the ears 24 of the bracket 23 and a wire seal 36 is passed through openings in the ears as clearly illustrated in Figures 2 and 4. The seal 36 may be applied by the public service electric company to prevent unauthorized tampering with the inside of the box 10 without detection.

Pivotally carried by the cover 12 is a door 37 for closing the open front of the cover 12. The door 37 includes a front panel 38 having vertical rearwardly extending side flanges 39—39 integral therewith. The flanges 39—39 extend beyond the top edge of the front panel 38 to provide ears 40 which fit against the side walls 28—28 inwardly of the top ends thereof. Pivots 41—41 pass through the ears 40—40 and side walls 28—28 and pivotally connect the door 37 to the cover 12 for up and down pivotal movement. Formed integral with the front panel 38 and extending forwardly thereof is a hollow dome shaped portion 42 of a diameter greater than that of the annular channel 31 and which houses the channel and the forwardly projecting manipulating handle 26 when the door is in closed position. When the door 37 is in closed position the flat front panel flatly engages the exterior of the front wall 27 of the cover and the flanges 39—39 respectively embrace the side walls 28—28 to provide a close joint therebetween. The joint between the top edge of the door panel 38 and the adjacent exterior portion of the front wall 27 of the cover is susceptible to the leakage of rain water therethrough, but any water seeping through this joint is caught by the channel 31 and prevented from reaching the front of the circuit breaker or seeping into the box through the slot 33. The annular channel 31 sheds the water about the opening 30, and the shed water drains through the joint between the bottom edge of the panel 38 and adjacent exterior of the front cover wall 27. To prevent the backing up of water in the dome-shaped portion 42 of the door, I provide an outwardly bent lip 42 on the lower edge of the center portion of the door panel 38 which defines a drain opening 44, the walls of which are spaced from the adjacent surface of the front cover wall 27. The lip 43 also serves as a finger grip to facilitate the raising and lowering of the door 37. When the door 37 is raised to its full open position as shown in Figure 2, the top edge of the door panel 38 engages beneath the edge of the front flange 18. This abutting engagement of the top edge of the door with the flange 18 limits the upward pivotal movement of the door beyond a horizontal position which assures closing of the door, for when released it drops by gravity to its normal closed position against the cover 12. The front panel of the door is provided with a slot 45 through which an ear 46 extends, the ear being secured to and projecting forwardly from the cover 12. The ear 46 has an opening therein through which the bolt of a padlock 47 may be passed when the door is closed for preventing unauthorized opening of the door. The padlock 47 may be applied to the box by the subscriber of the public service company's electrical service for he is entitled to have access to the actuating handle 26. The cover 12 may be removed from the box body by the public service representative by breaking the seal 36 without disturbing the lock 47. When the cover is replaced the same may be protected against unauthorized tampering by applying a new seal 36.

From the foregoing description, it will be seen that I have provided a weatherproof box for the housing of circuit breakers, switches, fuses, or other electrical devices which are accessible to a subscriber to a limited extent, the wire connections to the housed electrical device being safeguarded by the sealed cover 12. The opening 33 in the front of the cover through which the electrical device is exposed, is always protected against rain water, for the door 38 is of the drop type and cannot be accidentally left open, and any water which may seep through the open joint between the door and the front wall of the cover is shed about the opening 33 by reason of the annular channel 31, and the open joint and drain opening 44 at the bottom of the door.

The box 10 may be grounded by attaching a ground wire to the ground terminal connector 48 fixed to one of the side walls of the box body.

Having thus described the invention, what I claim as new and desire to secure by Letters Patent of the United States, is:

1. A weatherproof box for housing electrical devices comprising in combination, a metal box-like body open at its front and a top wall extending forward beyond the side walls of the body and provided with depending front and side flanges, a removable metal cover having side walls, said cover adapted to be applied to the open front of said body by engaging the side walls thereof with the side walls of said body by tilting and sliding the same upwardly so that the top of said cover engages the inner sides of the depending front and side flanges, means securing the cover in closed position; said cover having a curvilinear shaped opening therein through which a portion of an electrical device adapted to be housed in the box body is exposed, a forwardly extending trough shaped channel element formed integral with the walls of said opening, a metal door including a front panel and rearwardly extending side flanges, pivot means connecting the side flanges of said door to the side walls of said cover below the plane of the depending flanges on the top wall of said body, a hollow protrusion on the front panel of said door for receiving and enclosing said channel element when the door is closed, whereby water seeping through the joint between the top of said door and said cover will be shed around said opening by said channel element and be drained through the joint between the bottom of said door and said cover.

2. A weatherproof box for housing electrical devices constructed in accordance with claim 1, in which the top edge of the front panel of the door engages the depending front flange of the top wall of the box body to limit upward swinging movement of the door to a substantially horizontal position.

3. A weatherproof box for housing electrical devices comprising in combination a metal box body open at its front, a removable cover including a front wall and side walls extending rearwardly from said front wall, said front wall having a round opening therein, a forwardly extending annular trough shaped channel element integral with the walls of said opening and extending therearound, means for locking said cover to said box body, a metal door including a front panel and side flanges extending rearwardly from said front panel for overlapping the side walls of the box body, pivot means connecting the upper ends of said side flanges to the side walls of said cover to facilitate vertical swinging of said door relative to said cover, a hollow dome shaped protrusion formed in the front panel for receiving and housing said annular channel element when said door is closed, and an outwardly bent manipulating lip provided at the lower edge of the front panel centrally thereof, the inner walls of said lip being closely spaced from the front wall of said cover and cooperating therewith to define a drain opening, whereby water entering the joint between the top of said door and the cover will be shed about said opening by said annular channel element and drained from between the door and cover through the drain opening.

RALPH M. WALKER.